Dec. 4, 1956  W. P. KIRKWOOD  2,773,209
CARBON BRUSH HOLDER
Filed April 14, 1955

INVENTOR.
WILLIAM P. KIRKWOOD
BY Oldham & Oldham
ATTORNEYS

United States Patent Office 2,773,209
Patented Dec. 4, 1956

2,773,209

CARBON BRUSH HOLDER

William P. Kirkwood, North Royalton, Ohio

Application April 14, 1955, Serial No. 501,342

9 Claims. (Cl. 310—247)

This invention relates to electric machines, and especially to holders for carbon brushes received in such electric machines.

Heretofore there have been various types of carbon brush holders provided and these brush holders in general comprise an insulating sleeve which has a metal liner received therein. The insulation sleeve is positioned in the frame of the electric machine with one end extending from the frame and having a removable end cap thereon. The metal liner receives a carbon brush therein which extends axially inwardly of the machine from the brush holder. Resilient means are provided for urging the carbon brush outwardly of the holder for providing a good electrical contact between the carbon brush and the commutator portion of the machine.

A general object of the present invention is to provide a new and improved type of a carbon brush holder, which holder is less costly than previous types of holders but which is of a sturdy construction and is adapted to have a long service life.

Another object of the invention is to provide a carbon brush holder primarily made from molded insulation material which has reinforcing metal means provided therein at the portion of the carbon brush holder having major stresses set up thereon.

Yet another object of the invention is to provide a carbon brush holder that primarily comprises a molded insulation body having a wire coil embedded therein and extending the length thereof for conducting electrical energy from one end to the other of the carbon brush holder.

The foregoing and other objects and advantages of the invention will be made more apparent as the specification proceeds.

For a better understanding of the invention, attention is directed to the accompanying drawings, wherein.

In referring to corresponding parts shown in the accompanying drawings and referred to in the specification, corresponding numerals are used to facilitate comparison between such similar parts.

Figure 1:
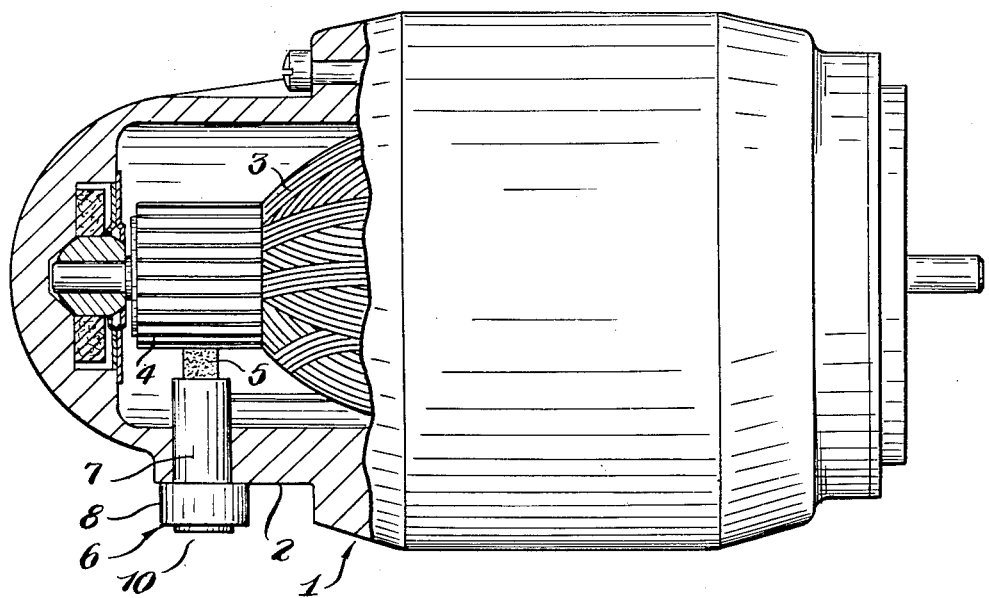
Fig. 1 is an elevation of an electric machine with one end portion thereof being broken away and partially shown in section.

The present invention, broadly speaking, relates to a brush holder for use in an electrical machine wherein such holder comprises an insulating body having a bore for receiving and positioning a carbon brush thereby, a removable end cap on the insulating body at one end thereof, and a metal electrical conductor in the insulating body and normally extending from end to end thereof with such conductor protruding from the end of the insulating body remote from the cap to provide an outlet terminal therefor, the conductor having a plurality of convolutions formed therein and exposed by the bore at the inner end of the insulation body to reinforce such section hereof.

Reference now should be had to the details of the construction shown in the accompanying drawings wherein an electrical machine is provided and indicated as a whole by the numeral 1. This machine 1 has a conventional frame 2 and has a rotor 3 journalled in a conventional manner in the frame 2. In this instance, a commutator 4 is provided on the rotor 3 and a plurality of carbon brushes 5 make electrical contact with the commutator 4 for withdrawing electrical current therefrom. Only one of such brushes 5 is shown and it is carried in a carbon brush holder indicated as a whole by the numeral 6. The brush holder 6 can be considered to be a sub-frame portion of the apparatus, if desired, inasmuch as such brush holder extends through the frame 2 from the outer to inner surface thereof and positions other members therein.

As an important feature of the invention, the brush holder 6 includes a body 7 made from an insulation material of a conventional nature and which may be a phenolic plastic, for example, or other suitable material. This body 7 has an annular flange 8 provided on the outer end thereof which flange may seat against the frame 2 to limit telescopic engagement of the brush holder 6 with the frame 2 to position the brush holder in engagement with the frame.

Figure 2:
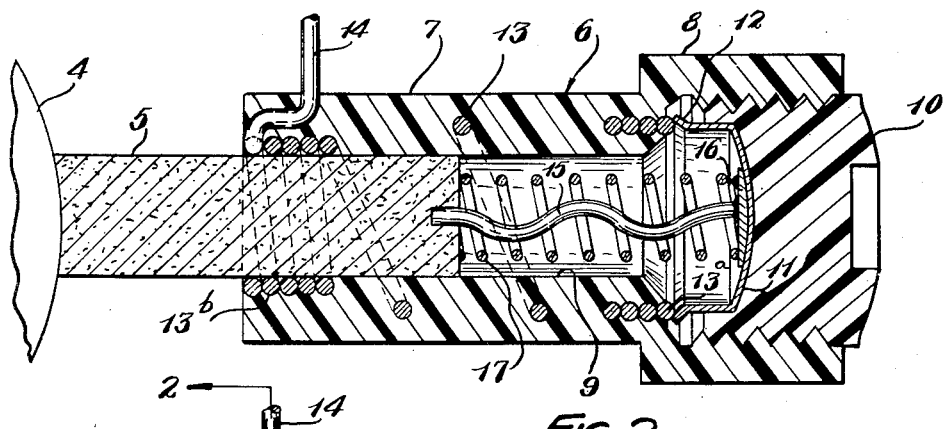
Fig. 2 is an enlarged longitudinal section taken through a carbon brush holder on line 2—2 of Fig. 3.

The insulation body 7 is of generally tubular shape and has a bore 9 extending the length thereof. The axially outer end of the insulation body 7 is tapped and has an end cap 10 in removable engagement therewith for closing the body 7 at its outer end and for permitting change of the carbon brush 5, as hereinafter explained. In order to provide a contact or electrical conducting member in association with the end cap 10, preferably a cup-shaped member or contact 11 is suitably carried by the end cap 10 in the inner surface thereof. The contact extends axially inwardly from the end cap 10 and has an outwardly flared inner end 12, as shown in Fig. 2 of the drawings to aid in obtaining a firm resilient contact between the wire 13 and the contact 11.

Figure 3:
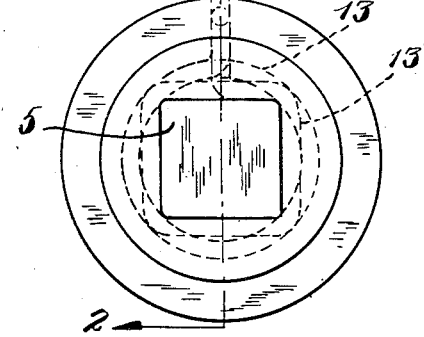
Fig. 3 is an end elevation of the carbon brush holder of Fig. 2 with the carbon brush removed.

Another important feature of the insulation body 7 is that it has a coil of wire 13 embedded therein and extending the length thereof from a portion adjacent the end cap 10 to the axially inner end of the body 7. Such wire 13 may be a spring wire member and it should be noted that an axially outer end of the wire forms several convolutions one of which indicated at 13a protrudes slightly from the body 7 and the outwardly flared end 10 of the cup 11 is engaged therewith. A plurality of abutted convolutions 13b are formed in the wire 13 at the axially inner end of the body 7 and such convolutions 13b have the inner surfaces thereof shown lying flush with the surfaces of the bore 9 so as to reinforce the insulation body 7 at the axially inner end thereof. These convolutions 13b, and the bore 9 are of substantially square shape, as shown in Fig. 3. However, the convolutions 13b will still reinforce the body 7, if of round shape, and/or if embedded in the body spaced from the bore 9. Thus the convolutions might be exposed only at the corners of the bore 9, for example: Such bore is contoured to be complementary in shape to the shape of the carbon brush 5 which is slidably and snugly received in the bore 9. An end 14 of the wire 13 usually extends laterally from the body 7 to provide a terminal for flow of electrical energy to or from the wire 13 and to the brush 5, as hereinafter described.

In all instances, the carbon brush holder is insulated from the apparatus in which it is positioned, and the outer surface of the end cap 10 also is insulated from the brush 5.

Normally the carbon brush 5 will have a relatively flexible electrical lead 15 secured thereto and extending therefrom which lead 15 has a contact disc 16 secured to the end thereof. Such lead 15 is received in and extends through a coil spring 17 compressed between the axially outer end of the carbon brush 5 and the contact disc 16 to provide a unit with the carbon brush. Such unit is received in the bore 9 of the insulation body 7 and is held therein by the end cap 10 that positions the contact 11 in pressure engagement with the contact disc 16. Hence the carbon brush 5 is continuously urged resiliently against the surface of the commutator 4. At the same time, the contact disc 16 is urged against the contact 11 carried by the end cap so that current from the carbon brush will flow through the end cap contact 11 to the wire 13 and the wire end 14 extending from the carbon brush holder, as is conventional in electrical apparatus.

It will be realized that any desired type of conductive means can be positioned to extend between the wire 13 and the lead 15. Thus the disc 16 may be of a size to be forced against the convolution 13a by a plastic end cap 10.

When it is desired to change the carbon brush 5 after it has become worn or damaged, all one needs to do is to remove the end cap 10 and the contact 11 from the carbon brush holder 6. Then the unit made from the carbon brush 5, lead 15, spring 17, and contact disc 16 can be pulled from the insulation body 7, after which a new brush unit can be inserted through the outer end of the brush holder.

From the foregoing it will be seen that the brush holder of the invention has a novel, positive conductor circuit from the brush 5 to a terminal 14. The unit is sturdy and is relatively easily made at low cost. Hence the objects of the invention are achieved.

While one complete embodiment of the invention has been disclosed herein, it will be appreciated that modification of this particular embodiment of the invention may be resorted to without departing from the scope of the invention as defined in the appended claims.

What is claimed is:

1. A carbon brush holder comprising an insulating body having a bore for receiving a carbon brush therein, a removable end cap on said insulating body, and a metal electrical conductor in said insulating body and extending from end to end thereof, said conductor protruding from the end of said insulating body remote from said cap, said conductor having a plurality of convolutions formed therein some of which are exposed by said bore to reinforce a section thereof but with other convolutions being completely embedded in said insulation body for reenforcing it.

2. A carbon brush holder comprising an insulating body having a longitudinal bore for receiving a carbon brush therein, a removable end cap on said insulating body, and an electrical conductor embedded in and reenforcing said insulating body and extending from end to end thereof, said conductor protruding from both ends of said insulating body for connection to electric circuit means.

3. A carbon brush holder comprising a molded insulating body having a center bore for receiving a carbon brush therein, a removable end cap on the outer end of said insulating body, and an electrical conductor molded into said insulating body and extending from end to end thereof, said conductor protruding laterally from the end of said insulating body remote from said cap and being exposed at said cap to engage therewith for passing electrical current from said cap to the inner end of said insulating body.

4. In an electric machine having a frame, a carbon brush holder comprising a tubular body of insulation material positioned by and extending through said frame, a removable end cap on the outer end of said body, a conductive cap liner on the inner surface of said end cap and protruding axially inwardly therefrom, a wire embedded in said body, one end of said wire extending from said sub-frame and contacting said cap liner, and contact means connecting to said wire at the inner end portion of said body, said wire having a plurality of convolutions outlining said bore at the inner end thereof for providing a reinforced bearing surface thereon to engage a brush received in said bore.

5. In an electric machine having a frame, a carbon brush holder comprising a sub-frame of insulation material positioned by and extending through said frame, a removable end cap on the outer end of said sub-frame, said sub-frame having a center bore therein, a metal cap liner on the inner surface of said end cap and protruding axially inwardly therefrom, and a wire spring embedded in said sub-frame, one end of said wire spring extending from said sub-frame and contacting said cap liner, another end of said wire spring protruding from said sub-frame at the inner end portion thereof, said wire spring having a plurality of convolutions outlining said bore at the inner end thereof for providing a reinforced bearing surface thereon to engage a brush received in said bore.

6. In an electric machine having a frame, a carbon brush holder comprising a sub-frame of insulation material positioned by and extending through said frame, a removable end cap of insulation material on the outer end of said sub-frame, said sub-frame having a center bore therein, a conductive member on the inner surface of said end cap and protruding axially inwardly therefrom, a wire embedded in said sub-frame and extending the length thereof, one end of said wire being exposed by said sub-frame and contacting said cap liner, said wire having a plurality of convolutions outlining said bore at the inner end thereof for providing a reinforced bearing surface thereon to engage a brush received in said bore.

7. In combination, a carbon brush, a conductor extending from one end of said brush, and a brush holder having a bore in which said carbon brush is received, said brush holder being made of insulation material, a wire being embedded in said brush holder and extending from end to end thereof, which wire has several abutted convolutions formed therein reinforcing the bore of the brush holder at the axially inner end thereof which engages said carbon brush.

8. A carbon brush holder comprising an insulating body having a longitudinal bore for receiving a carbon brush therein, a removable end cap on said insulating body, an electrical conductor embedded in said insulating body and extending from end to end thereof, and contact means carried by said end cap on an inner surface thereof and engaging said conductor.

9. A carbon brush holder comprising an insulating body having a longitudinal bore for receiving a carbon brush therein, a removable insulated end cap on said insulating body, an electrical conductor embedded in said insulating body and extending from end to end thereof, said conductor protruding from the end of said insulating body adjacent said end cap, and contact means forced against said conductor at the protruding portion thereof by said end cap.

References Cited in the file of this patent

UNITED STATES PATENTS

| | | |
|---|---|---|
| 1,904,208 | Dow | Apr. 18, 1933 |
| 2,708,723 | Staak | May 17, 1955 |